United States Patent [19]

Lám et al.

[11] Patent Number: 4,865,730

[45] Date of Patent: Sep. 12, 1989

[54] APPARATUS FOR THE REMOVAL OF FERROMAGNETIC MATERIALS FROM LIQUIDS, ORGANIC OR INORGANIC COMPOUNDS RESPECTIVELY MIXTURES—IN PARTICULAR FUELS—, FOR TREATING WITH MAGNETIC FIELD AND REDUCTION OF SURFACIAL STRESSES

[75] Inventors: Béla Lám; László Kálmán; Gábor Nagy; Sándor Marsó, all of Budapest, Hungary

[73] Assignee: Általános Szolgáltató és Épitöipari Kisszövetkezet, Budapest, Hungary

[21] Appl. No.: 54,941

[22] Filed: May 27, 1987

[30] Foreign Application Priority Data

Feb. 4, 1987 [HU] Hungary ................. 386/87

[51] Int. Cl.⁴ .............. B01D 35/06; B03C 1/02; C02F 1/48
[52] U.S. Cl. .................. 210/222; 123/538; 210/247
[58] Field of Search ........... 123/536, 537, 538, 539; 55/100; 209/223.1, 232; 210/222, 223, 247; 184/6.25

[56] References Cited

U.S. PATENT DOCUMENTS

| | | | |
|---|---|---|---|
| 2,583,522 | 1/1952 | Winslow et al. | 210/223 |
| 3,762,135 | 10/1973 | Ikebe et al. | 210/223 |
| 4,716,024 | 12/1987 | Pera | 210/222 |

FOREIGN PATENT DOCUMENTS

| | | | |
|---|---|---|---|
| 191810 | 9/1957 | Austria. | |
| 143823 | 9/1987 | European Pat. Off.. | |
| 91278 | 7/1930 | Hungary. | |
| 162455 | 8/1974 | Hungary. | |
| 51-76843 | 12/1974 | Japan | 210/222 |
| 315690 | 10/1977 | U.S.S.R.. | |

*Primary Examiner*—W. Gary Jones
*Attorney, Agent, or Firm*—Schweitzer & Cornman

[57] ABSTRACT

The invention relates to an apparatus for the removal of ferromagnetic materials from liquids, organic or inorganic compounds and mixtures, respectively, mainly fuels, for treating with a magnetic field and reduction of surface tension.

The apparatus according to the invention contains a plurality -at least two- coaxial magnets having a hole therein and being in the direction of flow of the liquid and being separated by a disc, as well as housing made of a non-magnetizable material closed at both ends with end-closing means and provided with a bore for passing through the liquid to be treated.

12 Claims, 2 Drawing Sheets

APPARATUS FOR THE REMOVAL OF FERROMAGNETIC MATERIALS FROM LIQUIDS, ORGANIC OR INORGANIC COMPOUNDS RESPECTIVELY MIXTURES—IN PARTICULAR FUELS—, FOR TREATING WITH MAGNETIC FIELD AND REDUCTION OF SURFACIAL STRESSES

FIELD OF THE INVENTION

The invention relates to an apparatus for the ferromagnetic treatment of liquids, organic or inorganic compounds or mixtures and for reducing surface tension.

BACKGROUND OF THE INVENTION

As it is well known, the surface tension of liquids can be considerably decreased under the influence of treating with a strong magnetic field. As a consequence of reduced surface tension dissolution and mixing of different additives admixed to the liquid, as well as atomizability increase to a large extent. Increased atomizability is considered as most advantageous with respect to fuels.

Treating with a magnetic field is most important not only in the case of fuels, but it was observed that when water was treated with a magnetic field -due to an unexplained mechanism- damaging scale deposition could be avoided on the walls of fittings and pipes in contact with the water.

Various solutions having been developed for the prevention of scale deposition from the liquids. Hungarian patent specification No. 91,278 discloses a solution, according to which electric current is allowed to pass through the liquid to achieve the desired effect.

A similar solution is disclosed in the Austrian patent No. 191,810, according to which the desired effect is obtained by using a special magnet system.

In Hungarian patent No. 162,455 it was tried to apply a three-phase rotating magnetic field. Soviet patent No. 315,690 describes the application of an electromagnetic field for the same purpose.

A common drawback of known processes and apparatuses lies in that the field of application is rather restricted, in the majority of cases it is limited to the treatment of water. A further disadvantage is that their formal resistance is high and harmful turbulent flow may occur in the apparatus, and thus they can be used only for a predetermined flow direction.

Fuels are known to contain a considerable amount of ferromagnetic material, even after fine filtration.

In view of the fact that the nozzles and atomizers of pumps of oil-heated equipment are most sensitive and the cost of regeneration of the feeders and atomizers of internal combustion motors is extremely high, apparatus is needed which can reduce or eliminate harmful properties of ferromagnetic materials.

SUMMARY OF THE INVENTION

An object of the present invention is the development of an apparatus which enables the treatment of any liquid, in particular a fuel, by means of a magnetic field to remove ferromagnetic material from the liquid, while substantially reducing surface tension. A further requirement is that by the conversion of single structural element the apparaatus should be suitable for treating any other liquid, such as water.

The object of the invention is realized with an apparatus, having a plurality -but at least two- coaxial magnets having bores arranged in the flow direction of the liquid and separated by one or more discs and a housing from a non-magnetizable material for enclosing the magnets and closed at both ends with closing means having a bore for passing the liquid to be treated through the bore.

A suitable embodiment of the apparatus according to the invention is provided with a magnet with a central bore and a liquid channel.

Another embodiment of the apparatus according to the invention is assembled from a magnet with a pemanent magnet core and a soft-iron armature.

An embodiment of the apparatus according to the invention, that is particularly suitable for water treatment, is povided with suitable guide elements perforated along one diameter, between the discs separating the magnets and formed as sealing elements.

All embodiments of the apparatus according to the invention have disc(s) and end-closing means made of a non-magnetizable material.

With all the embodiments of the apparatus according to the invention there is a releasable, suitably threaded, connection between the end-closing means and the housing.

The discs of an embodiment of the apparatus according to the invention, which is particularly suitable for the treating of fuels, are suitably machined to a predetermined depth within the width of the soft-iron armature, such predetermined depth being suitably about half of the armature.

In a further embodiment, the diameter of the central bore of the magnet equals about ⅓ of the diameter of the inflow fitting of the liquid to be treated.

In another embodiment of the apparatus according to the invention, the ratio of the width of the liquid channel to the central bore diameter is about 1:2.

In a further embodiment of the apparatus according to the invention the ratio of the thickness of the disc to the diameter of the central bore of the magnet is 1:20.

In yet another embodiment of the apparatus according to the invention the length of the magnet equals the fivefold of the diameter of the central bore.

BRIEF DESCRIPTION OF THE INVENTION

The apparatus according to the invention is described in detail by means of a preferred embodiment serving as an example, by the aid of the enclosed drawings, wherein:

FIG. 4 is the outline of a disc of the apparatus according to

Figure 1:
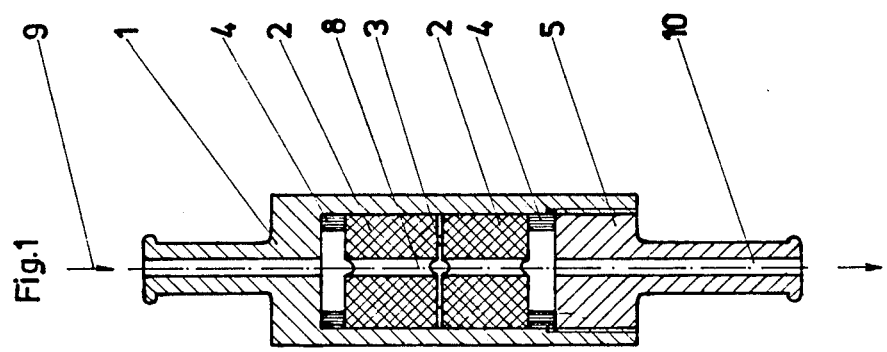
FIG. 1 is a cross-sectional view of the apparatus according to the invention.

FIG. 1, shaped in accordance with the invention; and

Figure 5:
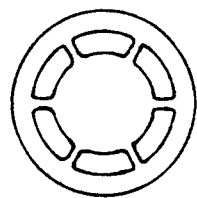

FIG. 5 is a baffle element applied in another embodiment of the apparatus according to the invention.

DETAILED DESCRIPTION OF THE PREFERRED EMBODIMENT

The apparatus according to the invention comprises a plurality, but at least two, magnets 2 provided with a soft-iron armature, the disc(s) 3 separating the magnets 2, as well as of the end-closing means 5, constricting openings in both ends of the apparatus and being provided with fitting 10 for passing through the liquid to be treated. A housing 1 is made of a non-magnetizable material, including all of the structural elements into a single unit.

Packing rings 4 are arranged between the end-closing means 5 and an adjacent magnet 2. There is a threaded connection between the endclosing means 5 and the housing.

The apparatus operates, as follows:

The liquid to be treated enters the apparatus as indicated by the arrow 9, wherein it first passes through the central bore 8 of the magnet 2 and impacts on the disc 3 arranged between the magnets 2; the disc 3 blocks the continued direct flow-through, and diverts the liquid into the liquid channel 7 of the magnet 2. The liquid channel 7 guides the liquid radially outwardly to the soft-iron armature 6 of the magnet 2, which borders the magnet 2. The lateral edge of the disc 3 is in contact with the armature 6 and is cut out, suitably as deeply as half of the soft-iron armature 6, so that the liquid to be treated -such as the fuel- will always pass through the strongest magnetic field and intersects the possibly largest number of magnetic lines of force.

At the cut-off part of the disc 3 the liquid to be treated flows over the edge of the disc to its other side into the liquid channel 7 of the second magnet 2. From there the liquid leaves the apparatus through the central bore 8 of the second magnet 2 and in the illustrated embodiment thorough the bore 10 of the end-closing means 5.

Figure 2:
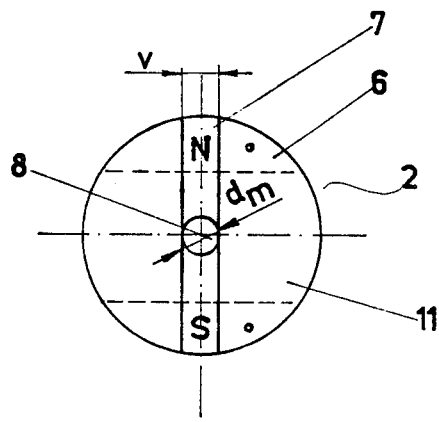
FIG. 2 is the magnet of the apparatus of FIG. 1.

As it becomes evident from FIG. 2, the magent 2 has a core 11 made of a permanent magnet and nthe sof-iron armature 6 is assembled integrally therewith.

The magnet 2 is formed with a central bore 8 and a liquid channel 7 running perpendicularly to the axis of the central bore 8 and extending along the diameter of the magnet 2.

Suitably the diameter $d_m$ ofo the central bore 8 of the magnet 2 about one third of the diameter $d_f$ of the fitting delivering the liquid, while the width v of the liquid channels 7 is about half of the diameter $d_m$ of the central bore.

Figure 4:
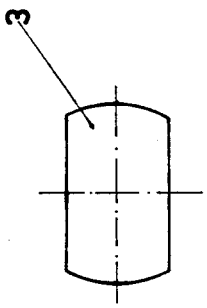
Figure 3:
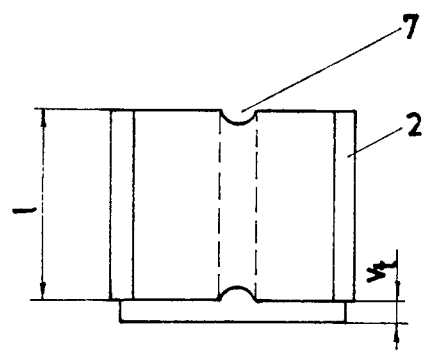
FIG. 3 is the side view of the magnet of FIG. 2.

FIG. 3 shows the shape of the liquid channels 7 and the relative positions of the magnet 2 and the disc 3. Magnet 2 and disc 3 are disposed coaxially relative to each other and the lateral edge of the disc 3 contacting the soft-iron armature 6 of othe magnet 2 is worked-off -see FIG. 4- in an optimal case to the half of the soft-iron armature 6, while the length h of the magnet 2 correponds to about the fivefold of the diameter $d_m$ of the central bore 8, while thickness $v_t$ of the disc 3 amounts to abou one twentieth of the diameter $d_m$ of the bore 8. The thickness of the disc 3 is always optionally determined by the intensity of the magnetic field.

The apparatus of the invention is particularly suitable for treating liquid fuels to remove magnetic contaminants, and in course of the treatment surface tension can be considerably reduced. Accordingly the fuel can be far better atomized and burned than without such treatment. The apparatus of the invention is well suited for treating other liquids, such as water. Precipitation and deposition of the materials contained in water can be prevented by its application.

Considering the fact that water treatment will be successful even with a magnetic field of lesser intensity, in that case the structural elements of the apparatus can be slightly altered in that longitudinal dimensions h of the magnets and thicknesses $v_t$ of the discs approach each other, furthermore, baffle elements, such as in FIG. 5 having been perforated along one diameter are arranged between the discs for guiding the flow of the water to be treated.

The advantage of the apparatus according to the invention is in its simple design. It can be easily installed wherever it is needed. In addition to prevention of the precipitation of harmful materials the apparatus considerably reduces surface tension of the liquid, thus ensuring the most economical use and burning of fuels.

What we claim:

1. Apparatus for cleaning a liquid flowing through the apparatus in a flow direction, by removing ferromagnetic materials from said liquid by reduction of the surface tension of the liquid by exposure to a magnetic field, comprising a nonmagnetizable housing, a plurality of magnets in said housing, each of said magnets having a bore substantially coaxial with its magnet, said magnets being disposed adjacent to each other with the bores of each magnet facing the bore of an adjacent magnet, each magnet being arranged with its bore being disposed in said flow direction, said housing having two ends, each of said ends being closed, means fo rconducting liquid to be cleaned into said housing through one closed end, and means for conducting cleaned liquid out from said housing at the other closed end, and means for creating an indirect flow path for said liquid between the respective bores in each of said adjacent magnets, the last said means including a channel formed in the surface of a magnet which faces the surface of an adjacent magnet, each channel being substantially perpendicular to an associated bore in the magnet.

2. The apparatus of claim 1, wherein said means for creating an indirect flow path further comprises a plate disposed between each adjacent magnet and blocking a direct flow-through of the liquid from the bore of one magnet into the bore of an adjacent magnet, whereby the fluid flow changes direction to flow in the channel of the magnet the bore of which it has just exited, then flow around the edge of said plate and flow through the channel of the adjacent magnet until it enters the bore thereof.

3. The apparatus of claim 1, further comprising at least one baffle element exposed adjacent to a plate, said baffle element being perforated at its periphery.

4. The apparatus of claim 2, wherein each plate has a peripheral portion cut off adjacent to an end of a channel within the surface of each magnet.

5. The apparatus of claim 2, wherein each plate is made of a nonmagnetizable material.

6. The apparatus of claim 1, wherein each magnet is surrounded at least partially with a soft-iron armature having a width.

7. The apparatus of claim 1, wherein each plate has a peripheral portion cut off adjacent to an end of a channel within the surface of othe magnet to the half of the width of said soft-iron armature.

8. The apparatus of claim 1, wherein at least one end of said housing is closed off with a threaded closure.

9. The apparatus of claim 1, wherein the diameter of the central bore in said magnets ia bou $\frac{1}{3}$ of the diameter of said meansn for conducting the liquid to be cleaned into said housing.

10. The apparatus of claim 1, wherein the width of said means for creating an indirect flow path for said liquid is about $\frac{1}{2}$ of the diameter of said bores.

11. The apparatus of claim 1, wherein the width of said means for creating an indirect flow path for said liquid is about 1/20 of the diameter of said bores.

12. The apparatus of claim 1, wherein the length of each magnet is about five times the diameter of said bores.

* * * * *